United States Patent [19]

Caunt et al.

[11] 4,385,161

[45] May 24, 1983

[54] OLEFINE POLYMERIZATION PROCESS

[75] Inventors: Anthony D. Caunt, Welwyn Garden City; Paul D. Gavens, Lower Stondon; John McMeeking, Welwyn Garden City, all of England

[73] Assignee: Imperial Chemical Industries Limited, London, England

[21] Appl. No.: 223,016

[22] Filed: Jan. 6, 1981

Related U.S. Application Data

[63] Continuation-in-part of Ser. No. 164,930, Jul. 1, 1980.

[30] Foreign Application Priority Data

| Jan. 10, 1980 [GB] | United Kingdom | 8000882 |
| Jun. 6, 1980 [GB] | United Kingdom | 8018582 |
| Dec. 11, 1980 [GB] | United Kingdom | 8039757 |

[51] Int. Cl.$^3$ .............................. C08F 4/02; C08F 4/66
[52] U.S. Cl. ............................... 526/114; 252/429 A; 252/429 B; 252/429 C; 526/116; 526/119; 526/129; 526/133; 526/137; 526/139; 526/140; 526/141; 526/142; 526/143; 526/348.6; 526/352; 526/901; 526/903; 526/907
[58] Field of Search ............... 526/129, 133, 137, 139, 526/140, 141, 143, 142, 114, 116, 119

[56] References Cited

U.S. PATENT DOCUMENTS

| 3,094,568 | 6/1963 | Hay et al. | 252/429 B |
| 3,409,681 | 11/1968 | Kroll | 252/429 B |
| 3,833,515 | 9/1974 | Amtmann et al. | 252/429 B |
| 3,888,789 | 6/1975 | Dombro et al. | 252/429 B |
| 4,165,298 | 8/1979 | Shiga et al. | 252/429 B |
| 4,218,339 | 8/1980 | Zucchini et al. | 252/429 B |
| 4,252,670 | 2/1981 | Caunt et al. | 252/429 B |

FOREIGN PATENT DOCUMENTS

| 1357474 | 6/1974 | United Kingdom . |
| 1434264 | 5/1976 | United Kingdom . |
| 2014164 | 8/1979 | United Kingdom . |
| 1554460 | 10/1979 | United Kingdom . |

OTHER PUBLICATIONS

Abstract of J52 127990 (Plasdoc Basic 87314Y).

*Primary Examiner*—Stanford M. Levin
*Attorney, Agent, or Firm*—Cushman, Darby & Cushman

[57] ABSTRACT

A catalyst component is a transition metal composition which is obtained by reacting together an inert particulate material, an organic magnesium compound, a halogen-containing compound such as carbon tetrachloride silicon tetrachloride or boron trichloride and a specified transition metal compound such as VOCl$_3$, bis(n-butoxy) titanium dichloride or zirconium tetrabenzyl. The catalyst component obtained can be used, together with an organic metal compound, to give an olefin polymerization catalyst. The catalyst can be used to effect the polymerization of olefin monomers, for example, the copolymerization of ethylene with an alpha-olefin monomer such as butene-1 in a fluidized bed reactor.

10 Claims, 1 Drawing Figure

OLEFINE POLYMERIZATION PROCESS

This application is a continuation-in-part of prior co-pending application Ser. No. 164,930 filed July 1, 1980.

The present invention relates to a process for the production of a component of an olefine polymerisation catalyst, the component thus obtained, polymerisation catalysts including the said component and an olefine polymerisation process using such catalysts.

Olefine monomers, such as ethylene, propylene and the higher alpha-olefines, can be polymerised using the so-called Ziegler-Natta catalysts. The term "Ziegler-Natta catalyst" is generally used to mean a catalyst system obtained from a compound of a transition metal of Groups IVA to VIA of the Periodic Table together with an organic compound of a non-transition metal of Groups IA to IIIA of the Periodic Table. Using such catalysts, ethylene polymers and copolymers having a wide range of characteristics can be prepared and propylene and the higher alpha-olefines can be polymerised to form a mixture of isotactic and atactic polymer, of which the isotactic polymer is the commercially desirable material. The polymer formed also contains catalyst residues and proposals have been made to produce catalyst systems which are sufficiently active to avoid the need to treat the polymer to reduce the level of such residues.

According to the present invention there is provided a process for the production of a composition suitable for use as a component of an olefine polymerisation catalyst, which process comprises treating a component I which is at least one substantially inert solid particulate material having reactive sites (as hereinafter defined), with a component II which is an organic magnesium compound or a complex or mixture of an organic magnesium compound and an aluminium compound, a component III which is at least one halogen-containing component selected from hydrogen halides, boron halides, halogens, inter-halogen compounds and halides of elements of Groups IVB, VB and VIB of the Periodic Table, and a component IV which is a transition metal compound of the formula A in the attached formula drawings, wherein:

M is transition metal of Group IVA, VA or VIA of the Periodic Table;

X is a halogen atom other than fluorine;

R is a hydrocarbon radical, a substituted hydrocarbon radical or a group $OR^1$;

$R^1$ is a hydrocarbon radical or a substituted hydrocarbon radical;

n is 0 or a number up to the valency of M with the exception that when M is titanium n does not have a value of 4;

a is 0 or 1;

b is 0 or a number up to the valency of M; and $2a+b+n$ equals the valency of M.

For convenience, the substantially inert solid particulate material having reactive sites will be referred to hereafter as the solid particulate material.

BRIEF DESCRIPTION OF THE DRAWING

In the drawing, the formulae A to I represent compounds which may be used in accordance with at least one aspect of the process of the present invention.

The formulae A to I in the attached drawing represent compounds which may be used in the present invention.

All references herein to the Periodic Table are to the Short Periodic Table as set out inside the back cover of "General and Inorganic Chemistry" by J. R. Partington, Second Edition, published by MacMillan and Company Limited, London in 1954.

In addition to components I to IV, an optional component V, which is a Lewis Base compound, may also be used in the production of the catalyst component.

In addition to the transition metal compound of the formula A, titanium tetrachloride may also be used in the production of the catalyst component but any titanium tetrachloride used should be such that not more than 75% molar of the total molar proportion of transition metal compounds present in the final product are derived from the titanium tetrachloride.

The process of the present invention may be effected by mixing all of the components together in a single stage but it is preferred to effect the process by adding the various components in sequence and thereby effecting the process in more than one stage. If the process is being effected in more than one stage by adding components II, III, or IV, or the optional component V or the optional titanium tetrachloride, in sequence to component I, then these stages may be effected in succession without separating the reaction product from the reaction mixture of one stage before adding a further component to effect the next stage. However, particularly if an excess quantity of any of components II, III or IV, or the optional component V, or the optional titanium tetrachloride, is used then it may be preferred to separate, and desirably wash, the reaction product from the stage in which such an excess is used before the reaction product is subjected to a subsequent stage of the process. It is usually desirable to separate and wash the reaction product after the stage in which component III is used.

It is preferred to effect the process of the present invention by contacting the at least one solid particulate material which is component I with one of components II, III or IV or optionally component V or titanium tetrachloride, and then treat in turn with the other components. It is generally preferred that the treatment with the specified transition metal compound, or with the optional titanium tetrachloride, is effected as the last stage. Thus, it is preferred that component I is treated first with component II or component III, the reaction product is treated with whichever of component II or III was not used in the first stage and then finally with component IV. In the preferred process, at least one further component is added after the addition of component III.

If the process is being effected in more than one stage and optional component V is being used, then component V is preferably used in one of the intermediate stages, that is in other than the first or last stage of the process. If titanium tetrachloride is being used as an optional component, it is conveniently used in the last stage, either as a mixture with component IV or as the only component, in which case component IV is used in an intermediate stage of the process. It should be appreciated that if the process is being effected in more than one stage, it is not necessary to add only a single further component to each stage and that it is possible to use more than one component in any stage, for example, a mixture of component III and optional component V, or a mixture of component IV and the optional titanium tetrachloride may be added to component I or to the reaction product from a previous stage.

Component I which is used in the process of the present invention is at least one substantially inert solid particulate material having reactive sites (as hereinafter defined). By "reactive sites" are meant those sites which are capable of abstracting a magnesium hydrocarbyl compound from a solution thereof. The number of reactive sites can be determined by adding, to a known weight of the at least one solid particulate material, a solution containing an excess quantity of a magnesium hydrocarbyl compound, stirring the mixture at ambient temperature for an hour and analysing the supernatant liquid to determine the quantity of the magnesium hydrocarbyl compound which remains in the solution, from which can be calculated the number of moles of magnesium hydrocarbyl compound which have been abstracted from the solution for each gramme of the solid particulate material, this being equivalent to the proportion, in moles, of the reactive sites.

The solid particulate material which is component I may be any such material which has been proposed previously for use in an olefin polymerisation catalyst system. Thus, the solid particulate material may be an organic or inorganic compound of a metal, which term is used herein to include silicon, such as a metal halide, or a metal oxide or mixtures or reaction products of two or more such metal compounds.

It is particularly preferred that the solid particulate material which is component I is a metal oxide, and in particular is an oxide of a metal of Groups I to IV of the Periodic Table. Solid oxides which may be used as component I include those with a substantially inert matrix material wherein at least some of the reactive sites are present in a hydroxylic surface (as hereinafter defined) which is free from adsorbed water. By "hydroxylic surface" is meant a surface having a plurality of —OH groups attached to the surface, the hydrogen atom of the —OH group being capable of acting as a proton source, that is, having an acidic function. A matrix material having a hydroxylic surface is substantially inert in that the bulk of the matrix material is chemically inert.

The at least one solid particulate material may be silica, alumina, magnesia, mixtures of two or more thereof, for example magnesium trisilicate which may be represented as $(MgO)_2(SiO_2)_3yH_2O$ (y is a positive number), or materials based thereon and containing minor amounts, for example less than 10% by weight, of other suitable solid particulate materials such as zinc oxide. Particularly useful solid particulate materials are silica and alumina.

The at least one solid particulate material preferably has a surface area of at least 30 $m^2/g$, particularly at least 100 $m^2/g$ and especially at least 200 $m^2/g$. Useful forms of the at least one solid particulate material may be obtained by heating a metal oxide or hydroxide in an inert atmosphere, and/or at a reduced pressure, to a temperature of at least 200° C. and not more than 1200° C. and preferably in the range 300° to 1000° C. A suitable inert atmosphere for the heating is nitrogen and a suitable reduced pressure is less than 10 mm of mercury. The temperature used will be dependent on the material being heated. Thus, if silica is being heated, it is especially preferred to use a temperature in the range 320° up to 400° C., for example 350° C. Using hydrated alumina, for example Boehmite (which may be regarded as hydrated gamma-alumina), or aluminium hydroxide, it is especially preferred to use a temperature in the range 400° up to 1000° C., for example 500° C. Alternatively, the at least one solid particulate material may be heated in a high boiling point inert hydrocarbon, or halohydrocarbon, liquid, for example under azeotropic conditions. Heating in the presence of an inert liquid medium is typically effected at a temperature in the range 100° C. up to 200° C. using a liquid having a boiling point in this range.

Component II which is used in the production of the catalyst component is an organic magnesium compound or complex or mixture thereof with an aluminium compound. The organic magnesium compound is a compound of formula B in the attached formula drawings, the complex thereof with an aluminium compound is represented by formula C in the attached formula drawings and the mixture thereof with an aluminium compound is represented by the formula D in the attached formula drawings.

In the formulae B, C and D, each $R^2$, which may be the same or different, is a hydrocarbon radical;

each Z, which may be the same or different, is a group $OR^1$ or a halogen atom other than fluorine;

$R^1$ is as hereinbefore defined;

c has a value of greater than 0 up to 2;

d has a value of greater than 0 up to 2; and e has a value of from 0 up to 3.

The groups $R^2$ are all typically alkyl groups and conveniently are alkyl groups containing from 1 up to 20 carbon atoms and especially 1 up to 6 carbon atoms. The groups Z are all preferably halogen atoms, other than fluorine, for example chlorine or bromine atoms. The value of c is preferably at least 0.5 and it is particularly preferred that c has a value of 2. The value of d is typically in the range 0.05 up to 1.0. The value of e is typically at least 1 and is preferably 3.

The organic magnesium compound of formula B, which is also present in the materials of formulae C and D, may be a Grignard reagent such as ethyl magnesium chloride or butyl magnesium bromide, or may be a compound such as ethyl magnesium ethoxide, but is preferably a magnesium dihydrocarbyl compound such as diethyl magnesium or dibutyl magnesium. Whilst the aluminium compound which is present in the materials of formulae C and D, may be aluminium chloride or aluminium bromide, it is preferably an organic aluminium compound such as ethyl aluminium dichloride, diethyl aluminium monochloride or diethyl aluminium ethoxide and is particularly an aluminium trihydrocarbyl compound such as aluminium triethyl or aluminium tributyl.

It will be appreciated that the materials of formulae C and D may be present together as an equilibrium mixture and indeed such a mixture may be obtained merely by mixing together the organic magnesium compound with the aluminium compound when the resultant product may be a mixture of the organic magnesium compound, the aluminium compound and the complex of formula D. It will be appreciated that it is preferred that the material of formula B, C or D is a material which is soluble in inert liquid hydrocarbons.

The organic magnesium compound, or the complex or mixture thereof with the aluminium compound, is conveniently added as a liquid medium to a solid material which is either the at least one solid particulate material or the product of reacting the at least one solid particulate material with at least one of the other components, including optional component V and the optional titanium tetrachloride, although it is preferred that the other component is one or both of components III and IV. The solid material to which the organic magnesium compound, or the complex or mixture thereof with the aluminium compound, is added is conveniently suspended in an inert liquid such as an aliphatic hydrocarbon. The liquid medium containing component II is conveniently a solution of the organic magnesium compound, or the mixture or complex thereof with the aluminium compound, in an inert liquid such as a hydrocarbon liquid, for example hexane, heptane, octane, decane, dodecane or mixtures of the isomers thereof, or inert halohydrocarbons such as chlorobenzene.

The quantity of the compound B, C or D which is added to the at least one solid particulate material, or the product of reacting the at least one solid particulate material with at least one of the other components, is dependent on the nature of the at least one solid particulate material, the surface area thereof and, in particular, any heat treatment used in obtaining the solid particulate material. The quantity of the compound B, C or D which is added may be in excess of that required to saturate the surface of the at least one solid particulate material, that is in excess of one mole for each mole of the reactive sites present on the at least one solid particulate material. When the solid particulate material is a metal oxide, typically at least some of the reactive sites are surface hydroxyl groups.

The quantity of the compound B, C or D which is used is also dependent on the quantity of the halogen-containing compound which is component III and, in particular, it is preferred that the molar quantity of the compound B, C or D which is used is less than the amount of the halogen-containing compound which is component III and in particular is from 0.25 up to 0.8 mole of compound B, C or D for each mole of the halogen-containing compound which is component III.

The compound B, C or D can be added to the at least one solid particulate material, or the product of the at least one solid particulate material and at least one of the other components at any suitable temperature, for example from 0° C. up to 100° C., conveniently at ambient temperature, that is from about 15° C. up to about 25° C. After adding the compound B, C or D to the at least one solid particulate material, or the product of the at least one solid particulate material and at least one of the other components, reaction is conveniently effected by allowing the materials to remain in contact for at least 5 minutes and not more than 20 hours, for example 0.25 up to 6 hours. After the desired period of contacting, the solid material which is the reaction product may be separated from the liquid medium, for example by filtration, decantation or evaporation, and may then be washed one or more times. If desired, the solid material which is the reaction product may be subjected finally to an optional low pressure (about 1 mm of mercury) treatment at ambient temperature, or higher, for a time of up to several hours, for example 2 hours before being used in the next stage of the preparation. However, these separation and washing operations are not essential, particularly if component II is used in an amount of less than one mole for each mole of reactive sites present in the at least one solid particulate material.

The at least one halogen-containing compound which is component III is preferably a chlorine-containing compound. If the halogen-containing compound is a halide of an element of Groups IVB, VB or VIB of the Periodic Table, it is preferred that this is an element of the second or third series. The at least one halogen-containing compound may be a hydrogen halide, a silicon halide of the formula E, a carboxylic acid halide of the formula F, a hydrocarbyl halide of the formula G, a phosphorus halide, a phosphorus oxyhalide, a boron halide, sulphuryl chloride, phosgene, nitrosyl chloride, chlorine, bromine, a chlorinated polysiloxane or an ammonium hexafluorosilicate, wherein:

$R^3$ is a hydrogen atom or a hydrocarbon radical;

$R^4$ is a hydrocarbon radical;

$R^5$ is the residue obtained by removing one or more hydrogen atoms from a hydrocarbon compound;

X is as hereinbefore defined;

f is 0 or an integer from 1 up to 3; and g is an integer from 1 up to 10.

In the silicon halides of formula E, it is preferred that $R^3$ is an alkyl group containing one up to six carbon atoms or an aryl, alkaryl or aralkyl group containing 6 up to 15 carbon atoms. In the carboxylic acids of formula F, it is preferred that $R^4$ is an alkyl group containing 1 up to 4 carbon atoms or an aryl, alkaryl or aralkyl group containing 6 up to 12 carbon atoms. In the hydrocarbyl halides of formula G, the group $R^5$ may be a carbon residue or may include hydrogen atoms and X, or each X, is preferably attached to an aliphatic carbon atom.

The silicon halides of formula E include silicon tetrachloride, silicon tetrabromide and halosilanes such as trichlorosilane, diethyl silicon dichloride, monobutyl silicon trichloride and monoethylsilicon trichloride.

The carboxylic acid halides of formula F include acetyl chloride, benzoyl chloride and p-methylbenzoyl chloride.

The hydrocarbyl halides of formula G include carbon tetrachloride, chloroform and 1,1,1-trichloroethane.

Suitable materials for use as the halogen-containing compound are halogenating agents by which is meant a halogen-containing compound which, when reacted with the at least one solid particulate material, or the product of reacting the at least one solid particulate material with at least one of the other components, gives a solid reaction product having an increased halogen content.

The at least one halogen-containing compound is conveniently added in a liquid form to a solid material which is the at least one solid particulate material, or the solid reaction product from a previous treatment stage. This addition may be effected by using a solution of the halogen-containing compound in an inert solvent such as an aliphatic hydrocarbon solvent. Thus, the reaction with the solid material is conveniently carried out by suspending the solid material in a liquid medium which is, or which contains, the halogen-containing compound. However, the halogen-containing compound may be used in the gas phase. Using a halogen-containing compound which is gaseous at ambient temperature, for example hydrogen chloride or boron trichloride, the gas is conveniently passed into a stirred suspension containing the solid material. Alternatively, a gaseous halogen-containing compound may be passed, optionally as a mixture with an inert gaseous diluent such as nitrogen, through a bed of the solid material, conveniently a fluidised bed. This latter technique can be used both with halogen-containing compounds which are gaseous at ambient temperature, and also with halogen-containing compounds having boiling temperatures above ambient temperature.

The reaction with the at least one halogen-containing compound can be effected at ambient temperature, or at an elevated temperature which may be as high as 600° C. but typically does not exceed 100° C. The preferred temperature will be dependent on the particular halogen-containing compound, for example, using silicon tetrachloride the temperature is preferably at least 60° C.

The quantity of the at least one halogen-containing compound is preferably sufficient to provide at least one halogen atom at every reactive site on the solid particulate material. It is convenient to add the halogen-containing compound in the amount of 1 mole for every mole of reactive sites on the solid particulate material. However, it should be appreciated that smaller quantities of the halogen-containing compound may be used, for example as little as 0.2 mole of the halogen-containing compound for each reactive site. Alternatively, an excess of the halogen-containing compound may be used, and this is conveniently achieved by suspending the solid material in an excess quantity of a liquid halogen-containing compound. The reaction with the at least one halogen-containing compound is conveniently effected for a time of from 0.25 up to 10 hours, preferably from 1 up to 5 hours.

After the reaction with the at least one halogen-containing compound, the reaction product is conveniently, but not necessarily, separated from the reaction medium and washed several times.

The transition metal compound of formula A which is used as component IV in the process of the present invention can be a metal halide, a metal oxyhalide, a metal hydrocarbon or a metal hydrocarbonoxy compound, and may include a mixture of substituents attached to the metal atom. The metal halides and oxyhalides are known as components of olefin polymerisation catalyst systems and include compounds of vanadium and zirconium such as vanadium tetrachloride, zirconium tetrachloride and vanadium oxytrichloride ($VOCl_3$). Metal hydrocarbonoxy compounds include metal alkoxy compounds and metal alkoxy halide compounds such as tetrakis(ethoxy)titanium, tetrakis(n-butoxy) titanium, bis(isopropoxy)titanium dichloride and bis(n-butoxy) titanium dichloride. Metal hydrocarbon compounds include a wide range of compounds and compounds of this type are disclosed, in association with a support material, in British Patent Specifications Nos. 1,314,828 and 1,513,673 and include zirconium tetrabenzyl and zirconium tetraneophyl.

The transition metal compound which is component IV may be added at any stage in the process but, if only one treatment with a transition metal compound is to be effected, this treatment is conveniently effected by adding the transition metal to the product of reacting the at least one solid particulate material with both component II and component III. The reaction may be effected by adding a solution of the transition compound to a solid material which is the product obtained from the preceding stages. Alternatively, if the transition metal compound is a liquid, the solid material may be suspended in the undiluted liquid transition metal compound. When undiluted liquid transition metal compound is used, the amount thereof will be such as to provide more than one mole of the transition metal compound for each mole of the reactive sites present on the at least one solid particulate material. If a solution of the transition metal compound is used, the amount of the transition metal compound which is added may be less than 1 mole for each mole of reactive sites, and is typically in the range from 0.1 mole up to 0.8 mole, and especially from 0.15 mole up to 0.6 mole, of transition metal compound for each mole of reactive sites.

The reaction of the transition metal compound with the solid material is conveniently carried out at a temperature of from 0° C. up to the boiling temperature of the liquid reaction medium, which may be a liquid transition metal compound, which may be as high as 150° C. at atmospheric pressure. However, some of the transition metal compounds which may be used have a reduced stability at elevated temperatures and it is preferred to use such compounds at temperatures at which they do not show an appreciably reduced stability, for example, at 0° C. or even below. In general, the reaction may be effected by contacting the solid material with a solution of the transition metal compound and stirring the mixture at ambient temperature. After adding the transition metal compound to the solid material, the materials are conveniently allowed to remain in contact for from 0.25 up to 10 hours, preferably 1 up to 5 hours. After the desired period of contacting, the product obtained may be separated from the liquid reaction medium and washed several times with an inert liquid medium, but this separation and washing is not essential.

If the treatment with the transition metal compound is effected as an intermediate stage in the process, this intermediate stage may be effected using an excess quantity of the transition metal compound if no further treatment with a transition metal compound is to be effected. In general it is preferred that there is, in addition to an intermediate treatment with the transition metal compound, a final treatment as hereinbefore described.

In addition to components I, II, III and IV, the process of the present invention may include reaction with an optional component V which is a Lewis Base compound. The treatment with optional component V is conveniently effected after component I has been reacted with at least one of component II or component III, especially at a stage subsequent to, but not necessarily directly after, the stage in which component II is reacted with the solid material. The treatment is conveniently effected by adding the Lewis Base compound to a suspension, in an inert hydrocarbon liquid, containing a solid material which is component I or, more preferably, the product of a previous stage. The quantity of the Lewis Base compound used is conveniently in an amount of up to one mole of Lewis Base compound for each mole of component II (the organic magnesium compound, or mixture or complex thereof with the aluminium compound) which has reacted with the solid particulate material, hereafter referred to as the "reacted component II". Preferred quantities of the Lewis Base compound are from 0.1 up to 0.8 mole for each mole of the reacted component II and especially at least 0.5 up to 0.8 mole for each mole of the reacted component II.

Conveniently, the treating of the solid material with the Lewis Base compound may be effected at temperatures of from 0° C. up to 100° C. and is very conveniently carried out at ambient temperature, that is from about 15° C. up to about 30° C. The treating is effected for any convenient time, which may be from 0.1 up to 70 hours, especially 1 up to 20 hours.

The Lewis Base compound can be any organic Lewis Base compound which has been proposed for use in a Ziegler polymerisation catalyst and which affects either the activity or stereospecificity of such a system. Thus, the Lewis Base compound may be an ether, an ester, a ketone, an alcohol, an ortho-ester, a thioether, a thioester, a thioketone, a thiol, a sulphone, a sulphonamide, a fused ring compound containing a heterocyclic sulphur atom, an organo-silicon compound such as a silane or siloxane, an amide such as formamide, urea and the substituted derivatives thereof such as tetramethylurea, thiourea, an alkanolamine, an amine, a cyclic amine such as pyridine or quinoline, a diamine such as tetramethylethylenediamine or an organo-phosphorus compound such as an organo-phosphine, an organo-phosphine oxide, an organo-phosphite or an organo-phosphate. The use of organo-Lewis Base compounds is disclosed, inter alia, in British Patent Specifications Nos. 803,198, 809,717, 880,998, 896,509, 920,118, 921,954, 933,236, 940,125, 966,025, 969,074, 971,248, 1,013,363, 1,017,977, 1,049,723, 1,122,010, 1,150,845, 1,208,815, 1,234,657, 1,324,173, 1,359,328, 1,383,207, 1,423,658, 1,423,659 and 1,423,660.

Preferred Lewis Base compounds are esters which may be represented by the formula H given in the attached formula drawings.

In the formula H, $R^6$ is a hydrocarbon radical which may be substituted with one or more halogen atoms and/or hydrocarbonoxy groups; and $R^7$ is a hydrocarbon radical which may be substituted by one or more halogen atoms.

The groups $R^6$ and $R^7$ may be the same or different and it is preferred that one, but not both, of the groups $R^6$ and $R^7$ includes an aryl group. The group $R^6$ is conveniently an optionally substituted alkyl or aryl group, for example a methyl, ethyl, or especially a phenyl, tolyl, methoxyphenyl or fluorophenyl group. The group $R^7$ is preferably an alkyl group containing up to 6 carbon atoms, for example an ethyl or a butyl group. It is particularly preferred that $R^6$ is an aryl or haloaryl group and $R^7$ is an alkyl group. Ethyl benzoate is an example of an ester of formula H.

After treating with the Lewis Base compound, the product thus formed may be separated from the reaction medium if desired and washed with an inert liquid.

The process of the present invention may also include an optional treatment with titanium tetrachloride which is used in an amount such that in the final product not more than 75% molar of the total molar proportion of transition metal compounds are derived from the titanium tetrachloride.

It is preferred to add the optional titanium tetrachloride to the product of reacting the at least one solid particulate material with both component II and component III, this procedure conveniently being effected together with the treatment with the transition metal compound which is component IV. The reaction may be effected by adding a solution of titanium tetrachloride, optionally together with the transition metal compound which is component IV, to a solid material which is the product obtained from the preceding stages. Alternatively, the solid material may be suspended in undiluted titanium tetrachloride. When undiluted titanium tetrachloride is used, the amount thereof will be in excess of one mole of titanium tetrachloride for each mole of the reactive sites present on the at least one solid particulate material. If a solution of titanium tetrachloride is used, the amount of the titanium tetrachloride which is added may be less than one mole for each mole of reactive sites, and is typically in the range from 0.1 mole up to 0.8 mole, especially from 0.15 up to 0.60 mole, of titanium tetrachloride for each mole of reactive sites.

The reaction of the optional titanium tetrachloride with the solid material is conveniently carrid out at a temperature of from 0° C. up to the boiling temperature of titanium tetrachloride, which is about 137° C. at atmospheric pressure. If the solid material is contacted with neat titanium tetrachloride this may be carried out at the boiling temperature of titanium tetrachloride. However, if the solid material is contacted with a solution of titanium tetrachloride this may conveniently be effected by stirring the mixture at ambient temperature. After adding the titanium tetrachloride to the solid material, the materials are conveniently allowed to remain in contact for from 0.25 up to 10 hours, preferably 1 up to 5 hours. After the desired period of contacting, the solid product obtained may be separated from the liquid reaction medium and washed several times with an inert liquid medium, but this separation and washing is not essential.

If the treatment with the transition metal compound which is component IV is effected as an intermediate stage in the process, the final stage may be effected using only titanium tetrachloride.

The product obtained by the process of the present invention contains one or more transition metal compounds and a magnesium halide composition supported on at least one solid particulate material. This product may be used as one component of an olefine polymerisation catalyst.

More specifically, as a further aspect of the present invention, there is provided an olefine polymerisation catalyst which comprises:

(1) the reaction product obtained by the process of the present invention; and (2) an organic compound of a metal of Group IIA of the Periodic Table or of aluminium or a complex of an organic compound of a metal of Group IA or Group IIA of the Periodic Table with an organic compound of aluminium.

Component (2) of the catalyst can be a magnesium-containing compound of formula B, C or D in the attached formula drawings.

If the component (2) is a complex of a metal of Group IA with an organic aluminium compound, this compound may be of the type lithium aluminium tetraalkyl. It is preferred that the component (2) is an organic aluminium compound which may be, for example, an aluminium hydrocarbyl halide such as a dihydrocarbyl aluminium halide, an aluminium hydrocarbyl sulphate, or an aluminium hydrocarbyl hydrocarbyloxy but is preferably an aluminium trihydrocarbyl or a dihydrocarbyl aluminium hydride. The aluminium trihydrocarbyl is preferably an aluminium trialkyl in which the alkyl group contains from 1 up to 8 carbon atoms and is particularly an ethyl group.

Using an aluminium trihydrocarbyl compound as component (2), it is preferred that the catalyst system also includes a Lewis Base compound if the catalyst system is to be used to polymerise a higher olefin monomer such as propylene. The Lewis Base compound can be any Lewis Base compound of the type disclosed for the production of component (1) of the catalyst system and preferred Lewis Base compounds are esters of formula H. Esters of anisic acid (4-methoxybenzoic acid) are particularly preferred as the Lewis Base component of the catalyst system.

In addition to, or instead of, the Lewis Base compounds, the catalyst system may also include a substituted or unsubstituted polyene, which may be an acyclic polyene such as 3-methylheptatriene(1,4,6), or a cyclic polyene such as cyclooctatriene, cyclooctatetraene, or cycloheptatriene or the alkyl- or alkoxy-substituted derivatives of such cyclic polyenes, tropylium salts or complexes, tropolone or tropone.

The proportions of components (1) and (2) of the catalyst system can be varied within a wide range as is well known to the skilled worker. The particular preferred proportions will be dependent on the type of materials used and the absolute concentrations of the components but in general we prefer that for each gramme atom of the transition metal which is present in component (1) of the catalyst system there is present at least one mole of component (2) and preferably at least 5 moles of component (2) for each gramme atom of the transition metal or transition metals. The number of moles of component (2) for each gramme atom of total transition metal in component (1) may be as high as 1000 and conveniently does not exceed 500.

When the catalyst system includes a Lewis Base component in addition to component (2), it is preferred that the Lewis Base compound is present in an amount of not more than one mole for each mole of component (2) and particularly from 0.1 up to 0.5 mole of the Lewis Base compound for each mole of the component (2). However, depending on the particular organic metal compound and Lewis Base compound, the proportion of the Lewis Base compound may need to be varied to achieve the optimum catalyst system.

If the catalyst system includes a polyene, it is preferred that the polyene is present in an amount of not more than one mole for each mole of component (2), and especially from 0.01 up to 0.20 mole for each mole of component (2). If the catalyst system includes both a Lewis Base component and a polyene, it is preferred that both of these materials are together present in an amount of not more than one mole for each mole of component (2).

Catalyst in accordance with the present invention can be used to polymerise or copolymerise olefine monomers.

Thus, as a further aspect of the present invention there is provided an olefine polymerisation process which comprises contacting, under polymerisation conditions, at least one olefine monomer with a catalyst in accordance with the present invention.

The olefine monomer which may be contacted with the catalyst system is one having the formula I as set out in the accompanying formula drawings.

In the formula I, $R^8$ is a hydrogen atom or an alkyl radical.

Thus, the olefine may be ethylene, propylene, butene-1, pentene-1, hexene-1, 4-methylpentene-1 or any other olefin which satisfies formula I. The olefin monomer is preferably one containing not more than 10 carbon atoms. The olefin monomers may be homopolymerised or may be copolymerised together. If propylene is copolymerised it is preferred to effect the copolymerisation with ethylene, conveniently using a sequential copolymerisation process as is described in British Patents 970 478; 970 479 and 1 014 944. If ethylene is being copolymerised using the process of the present invention, it is preferred to carry out the copolymerisation using a mixture of ethylene and the desired comonomer, for example butene-1 or hexene-1, wherein the mixture of monomers has essentially the same composition throughout the polymerisation process.

Component (1) of the catalyst may be mixed with the other component, or components, in the presence of the monomer. If the catalyst includes a Lewis Base compound, it is preferred to premix the organic metal compound which is component (2) with the Lewis Base compound and then to mix this pre-mixture with the reaction product which is component (1).

As is well known, Ziegler-Natta type catalysts are susceptible to the presence of impurities in the polymerisation system. Accordingly, it is desirable to effect the polymerisation using a monomer, and a diluent if this is being used, which has a high degree of purity, for example a monomer which contains less than 5 ppm by weight of water and less than 1 ppm by weight of oxygen. Materials having a high degree of purity can be obtained by processes such as those described in British Patent Specifications 1 111 493; 1 226 659 and 1 383 611.

Polymerisation can be carried out in the known manner, for example in the presence or absence of an inert diluent such as a suitably purified paraffinic hydrocarbon, in the liquid phase using an excess of the liquid monomer as the polymerisation medium or in gas phase, this latter term being used herein to mean the essential absence of a liquid medium.

If polymerisation is effected in gas phase, it may be effected by introducing the monomer, for example propylene, into the polymerisation vessel as a liquid and operating with conditions of temperature and pressure within the polymerisation vessel which is such that the liquid monomer vaporises, thereby giving an evaporative cooling effect, and essentially all of the polymerisation occurs with a gaseous monomer. Polymerisation in gas phase may be effected using conditions which are such that the monomer is at a temperature and partial pressure which are close to the dew point temperature and pressure for that monomer, for example as described in more detail in British Patent Specification 1 532 445. Polymerisation in gas phase can be effected using any technique suitable for effecting a gas-solid reaction such as a fluidised-bed reactor system, a stirred-bed reactor system or a ribbon blender type of reactor.

Using the catalyst systems of the present invention, ethylene may be polymerised or copolymerised, for example with butene-1 as the comonomer, in a fluidised-bed reactor system to give a high yield of polymer. The fluidising gas is the gas mixture to be polymerised together with any hydrogen which is present as a chain transfer agent to control molecular weight. Thus, for the copolymerisation of ethylene and butene-1 to produce an ethylene copolymer having a density of less than about 940 kg/m$^3$, the gas composition is typically from 50 to 60 mole % ethylene, 15 to 25 mole % butene-1 with the remainder, apart from inert materials and impurities, being hydrogen.

When the ethylene is polymerised, or copolymerised, the molecular weight distribution (MWD) of the polymer obtained in dependent, to some extent, on the nature of component (1) of the catalyst system. In particular, the MWD of the polymer is dependent on the transition metal compound, or compounds, used in producing component (1) and is also influenced by the nature of the halogen-containing compound and how this is incorporated into the catalyst system. We have found that if component (1) has been obtained by using an alkoxy titanium halide, the polymer obtained generally has a narrower MWD than is obtained when component (1) has been obtained using titanium tetrachloride.

Polymerisation may be effected either in a batch manner or on a continuous basis, and the catalyst components may be introduced into the polymerisation vessel separately or all the catalyst components may be mixed together before being introduced into the polymerisation reactor. It will be appreciated that any pre-mixing of all the catalyst components is preferably effected in the presence of a monomer and such pre-mixing will result in at least some polymerisation of this monomer before the catalyst system is introduced into the polymerisation vessel. If the polymerisation is being carried out in the gas phase, the catalyst components may be added to the polymerisation reactor suspended in a stream of the gaseous monomer or monomer mixture.

Since the process of producing component (1) of the catalyst includes a step of treating with an organic magnesium compound, or a complex or mixture of an organic magnesium compound and an aluminium compound, component (1) of the catalyst may show some polymerising activity, particularly for ethylene, even in the absence of component (2) of the catalyst. If component (1) of the catalyst system possesses polymerisation activity, this may cause blocking of the catalyst metering or feeding devices when using a stream of a polymerisable monomer as the medium for transporting component (1) of the catalyst system. To avoid this, component (1) may be temporarily deactivated, or pacified, by treatment with a suitable "pacifying agent". Suitable "pacifying agents" include carbon monoxide, carbon dioxide and also reagents which remove metal-carbon or metal-hydrogen bonds from the transition metal composition which is component (1) of the catalyst system. Typically the "pacifying agent" is a protic reagent such as a carboxylic acid, an aliphatic alcohol having from one up to six carbon atoms or an anhydrous hydrogen halide. Hydrogen halides, especially hydrogen chloride, are preferred "pacifying agents". Using hydrogen chloride, this may be bubbled through a suspension of component (1) of the catalyst system in an inert diluent and any excess is removed by sparging with an inert gas such as nitrogen. The "pacifying agent" is used in a manner, and in proportions, such that when the pacified component (1) is mixed with component (2) an active polymerisation catalyst system is obtained.

The polymerisation can be effected in the presence of a chain transfer agent such as hydrogen or a zinc dialkyl, in order to control the molecular weight of the product formed. If hydrogen is used as the chain transfer agent in the polymerisation of propylene, it is conveniently used in an amount of from 0.01 up to 5.0%, particularly from 0.05 up to 2.0% molar relative to the monomer. When the monomer being polymerised is ethylene, or a mixture in which ethylene is a major polymerisable component (by moles), the amount of hydrogen used may be greater, for example, in the homopolymerisation of ethylene the reaction mixture may contain in excess of 50% molar of hydrogen, whereas if ethylene is being copolymerised, a proportion of hydrogen which is typically up to 35% molar is used. The amount of chain transfer agent will be dependent on the polymerisation conditions, especially the temperature, which, at polymerisation pressures not exceeding 50 kg/cm$^2$, is typically in the range from 20° C. up to 100° C., preferably from 50° C. up to 85° C.

Polymerisation can be effected at any pressure which has been previously proposed for effecting the polymerisation of olefine monomers. However, although the polymerisation may be effected at pressures up to 3000 kg/cm$^2$, at which pressures the polymerisation temperature may be as high as 260° C., it is preferred to carry out the polymerisation at relatively low pressures. Whilst the polymerisation may be effected at atmospheric pressure, it is preferred to use a slightly elevated pressure and thus it is preferred that the polymerisation is effected at a pressure of from 1 kg/cm$^2$ up to 50 kg/cm$^2$, preferably from 5 up to 30 kg/cm$^2$.

It will be appreciated that the particle form of the polymer obtained is dependent upon, and hence is affected by, the particle form of the at least one solid particulate material which is used as component I in the production of the transition metal composition which is component (1) of the catalyst system. Hence, by the selection of a solid particulate material having an appropriate particle form, such as essentially spherical particles, a polymer of a desired form may be obtained.

Various aspects of the present invention will now be described with reference to the following Examples which are illustrative of the invention. In the Examples, all operations are effected under an atmosphere of nitrogen unless otherwise indicated. All the glass apparatus was dried in an air oven at 120° C. for at least one hour and purged with nitrogen before use.

(A) Treatment of alumina

A sample of hydrated gamma-alumina (Ketjen Grade B obtainable from Akzo Chemie of Amsterdam, Holland) was heated up to 700° C. under nitrogen at atmospheric pressure, maintained at 700° C. for two hours and then allowed to cool, in the oven, to ambient temperature.

(B) Purification of solvents

All the solvents used were essentially pure and dry. Before use, the solvents were purged with nitrogen and evacuated to a low pressure, the purging and evacuation being repeated four times.

(C) Treatment of silica

A sample of silica (Davison 952 grade from W R Grace and Company of Maryland, USA) was heated up to 350° C. under nitrogen at atmospheric pressure, maintained at 350° C. for two hours and then allowed to cool, in the oven, to ambient temperature.

EXAMPLE 1

Preparation of transition metal reaction product (a) Reaction with alumina and silicon tetrachloride 114 g of the alumina dried as described in treatment A) were suspended in 1140 cm$^3$ of an isoparaffin fraction, essentially all of which had a boiling temperature in the range from 117° C. up to 135° C., in a two liter jacketted reaction vessel provided with a stirrer. 19 cm$^3$ of silicon tetrachloride were added to the suspension. The mixture was heated to 80° C. and maintained at that temperature for three hours and allowed to settle. The supernatant liquid was removed by decantation and the solid was washed four times by decantation using 1800 cm³ of the isoparaffin fraction at ambient temperature for each wash. The washed solid was then suspended in 1140 cm³ of the isoparaffin fraction at ambient temperature.

(b) Treament with magnesium dibutyl

To the mixture from step (a) were added 92 cm³ of the 0.62 M solution of magnesium dibutyl (an equimolar mixture of primary and secondary dibutyl magnesium) in the isoparaffin fraction. This mixture was stirred, heated to 80° C. and maintained at that temperature for 1 hour 20 minutes.

(c) Treatment with titanium tetrachloride/vanadium oxytrichloride mixture

An equimolar mixture of titanium tetrachloride and vanadium oxytrichloride were dissolved in the isoparaffin fraction to give a 0.95 M (with respect to total transition metal) solution. 48 cm³ of this solution were added to the reaction mixture from step (b) which was still at 80° C. The mixture thus obtained was stirred at 80° C. for 30 minutes, allowed to cool and the mixture was subjected to no further treatment. The solid reaction product present in the reaction mixture will hereafter be identified as TMC-I.

In the foregoing procedure in step (a), 1.5 millimole of silicon tetrachloride was used for each gramme of alumina (which contained approximately 1 millimole of reactive sites per gramme), in step (b), 0.5 millimole of magnesium dibutyl was used for each gramme of alumina, and in step c), 0.4 millimole of a mixture of titanium tetrachloride and vanadium oxytrichloride was used for each gramme of alumina.

EXAMPLE 2

Preparation of transition metal reaction product (a) Reaction with alumina and zirconium tetrabenzyl 95 g of the alumina dried as described in treatment (A) were suspended in 950 cm³ of the isoparaffin fraction in a two liter jacketted reaction vessel provided with a stirrer. 316 cm³ of a 0.0932 M solution, in toluene, of zirconium tetrabenzyl were added to the suspension. The mixture was then stirred at ambient temperature (about 20° C.) for 20 minutes. The mixture was allowed to settle and the supernatant liquid was decanted off. The solid was washed once by decantation using 1000 cm³ of the isoparaffin fraction at ambient temperature and the washed solid was suspended in 950 cm³ of the isoparaffin fraction at ambient temperature.

(b) Treatment with silicon tetrachloride

To the stirred mixture from step (a) were added 20.9 cm³ of silicon tetrachloride, the mixture was heated to 80° C. and maintained at that temperature for 1.5 hours. The mixture was allowed to cool and settle, the supernatant liquid was removed by decantation and the solid was washed three times by decantation using 1500 cm³ of the isoparaffin fraction at ambient temperature for each wash. The washed solid was then suspended in 950 cm³ of the isoparaffin fraction at ambient temperature.

(c) Treatment with magnesium dibutyl

To the stirred mixture from step (b) were added 73.5 cm³ of the 0.62 M solution of magnesium dibutyl used in step (b) of Example 1. The mixture thus obtained was stirred for 1 hour 20 minutes at ambient temperature.

(d) Treatment with titanium tetrachloride

To the stirred reaction mixture from step (c) were added 5.2 cm³ of titanium tetrachloride. The mixture was stirred at ambient temperature for one hour and the mixture was subjected to no further treatment. The solid reaction product present in the reaction mixture will hereafter be identified as TMC-II.

EXAMPLE 3

Preparation of transition metal reaction product (a) Reaction with silica and magnesium dibutyl 108 g of the silica dried as described in treatment (C) were suspended in 800 cm³ of the isoparaffin fraction in a two liter jacketted reaction vessel provided with a stirrer. 351 cm³ of the 0.62 M solution of magnesium dibutyl solution used in step (b) of Example 1 were added to the suspension. The mixture was then stirred at ambient temperature for four hours. The mixture was allowed to settle, the supernatant liquid was removed by decantation and the solid was washed three times by decantation using 1000 cm³ of the isoparaffin fraction at ambient temperature for each wash.

(b) Treatment with silicon tetrachloride

To the washed solid from step (a) were added 500 cm³ of silicon tetrachloride and the volume of the mixture was made up to 1300 cm³ by the addition of an appropriate quantity of the isoparaffin fraction. This mixture was stirred, heated to 80° C. and maintained at that temperature for four hours. The mixture was then allowed to settle, the supernant liquid was removed by decantation and the solid was washed six times by decantation using 1000 cm³ of the isoparaffin fraction at ambient temperature for each wash. The washed solid was then suspended in 1000 cm³ of the isoparaffin fraction.

(c) Treatment with ethyl benzoate

To the mixture from step (b), were added 21.8 cm³ of ethyl benzoate and the mixture was stirred at ambient temperature for two hours. The supernatant liquid was removed by decantation and the solid was washed once by decantation with 1000 cm³ of the isoparaffin fraction. The excess liquid was removed by forcing it through a glass tube at the lower end of which was located at sintered glass frit.

(d) Treatment with bis(isopropoxy) titanium dichloride

The filtered solid from step (c) was suspended in 8 moles of liquid bis(isopropoxy)titanium dichloride at 80° C. and the mixture was stirred at 80° C. for four hours. The mixture was allowed to settle and the supernatant liquid was decanted off. The solid was washed four times by decantation using 1000 cm³ of the isoparaffin fraction at 80° C. for each wash and was washed a further three times by decantation using 1000 cm³ of the isoparaffin fraction at ambient temperature for each wash. The solid was finally suspended in 1500 cm³ of the isoparaffin fraction at ambient temperature. The solid reaction product obtained will hereafter be identified as TMC-III.

EXAMPLE 4

Preparation of transition metal reaction product

Step (a) of Example 1 was repeated using 72 g of alumina, 720 cm³ of the isoparaffin fraction and 11.9 cm³ of silicton tetrachloride.

Step (b) of Example 1 was repeated using 55.7 cm³ of the solution of magnesium dibutyl.

Step (c) of Example 1 was repeated by adding to the reaction mixture from step (b), 121 cm³ of a 0.24 M solution of bis(isopropoxy) titanium dichloride in the isoparaffin fraction. The solid reaction product present in the reaction mixture will hereafter be identified as TMC-IV.

In the foregoing procedure, in step (a) 1.5 millimole of silicon tetrachloride was used for each gramme of alumina, in step (b) 0.5 millimole of magnesium dibutyl was used for each gramme of alumina, and in step (c) 0.4 millimole of bis(isopropoxy) titanium dichloride was used for each gramme of alumina.

EXAMPLE 5

Preparation of transition metal reaction product (a) Reaction with silica and magnesium dibutyl 108 g of the silica dried as described in treatment (c) were suspended in 800 cm$^3$ of the isoparaffin fraction in a two liter jacketted glass reaction vessel provided with a stirrer. 351 cm$^3$ of a 0.625 M solution of the magnesium dibutyl as used in step (b) of Example 1, were added to the suspension. The mixture was then stirred at ambient temperature (about 20° C.) for four hours. The supernatant liquid was decanted off and the solid was washed five times using one liter of the isoparaffin fraction for each wash. The solid was finally resuspended in one liter of the isoparaffin fraction.

(b) Treatment with silicon tetrachloride

To the mixture from step (a) were added 500 cm$^3$ of silicon tetrachloride. This mixture was stirred for 60 hours at ambient temperature then heated up to 80° C. and stirred at that temperature for a further four hours. The mixture was then allowed to cool and settle, the liquid was decanted off and the solid was washed six times using one liter of the isoparaffin fraction at ambient temperature for each wash. After the last wash, most of the residual liquid was removed by forcing it through a glass tube at the lower end of which was located a sintered glass frit.

(c) Treatment with ethyl benzoate

The washed solid from step (b) was suspended in a solution of 21.8 cm$^3$ of ethyl benzoate in one liter of the isoparaffin fraction and the mixture was stirred at ambient temperature for two hours. The supernatant liquid was then decanted off and the solid was washed twice using one liter of the isoparaffin fraction at ambient temperature for each wash. After the last wash, most of the residual liquid was removed by forcing it through a glass tube at the lower end of which was located a sintered glass frit.

(d) Treatment with bis(isopropoxy)titanium dichloride

The washed solid from step (c) was suspended in 8 moles (about 1630 cm$^3$) of liquid bis(isopropoxy) titanium dichloride, at 80° C. and the mixture was stirred at that temperature for four hours. The supernatant liquid was decanted off without cooling and the solid was then washed four time using one liter of the isoparaffin fraction at 80° C. for each wash, and three further times using one liter of the isoparaffin fraction at ambient temperature for each wash. The solid was finally suspended in 1500 cm$^3$ of the isoparaffin fraction at ambient temperature. A small sample of the suspension was retained and the remaining, major, portion was transferred to a filter vessel, filtered and dried at 50° C. for four hours at a pressure of 5 mm of mercury.

The solid reaction product obtained will hereafter be identified as TMC-V.

EXAMPLE 6

Preparation of transition metal reaction product

The procedure of steps (a) and (b) of Example 5 was repeated but the filtered solid was then dried at 50° C. for four hours at a pressure of 5 mm of mercury.

15.4 g of the dried solid were placed in a 500 cm$^3$ jacketted glass reaction vessel fitted with a stirrer. 170 cm$^3$ of bis(n-butoxy) titanium dichloride at ambient temperature was added to the reaction vessel, the mixture was stirred, heated to 80° C. and maintained at that temperature for three hours. The supernatant liquid was removed by decantation, the solid was washed five times using 250 cm$^3$ of the isoparaffin fraction at 80° C. for each wash and was finally resuspended in 250 cm$^3$ of the isoparaffin fraction at ambient temperature.

The solid reaction product obtained will hereafter be identified as TMC VI.

EXAMPLE 7

Preparation of transition metal reaction product

A 12.6 g portion of the solid resulting from the drying step in Example 6, was placed in a 500 cm$^3$ three-necked glass flask. 0.77 cm$^3$ of undiluted bis(n-butoxy) titanium dichloride was added followed by 126 cm$^3$ of the isoparaffin fraction at ambient temperature. The mixture was stirred without heating for 30 minutes when examination of the supernatant liquid showed that no titanium remained in the solution. The solid reaction product obtained will hereafter be identified as TMC VII.

EXAMPLE 8

Preparation of transition metal reaction product

The procedure of steps (a), (b) and (c) of Example 5 was repeated with the exception that in step (a), 123.8 g of silica and 247 cm$^3$ of a 0.646 M solution of magnesium dibutyl were used, in step (b), 550 cm$^3$ of silicon tetrachloride were used, in step (c) 25 cm$^3$ of ethyl benzoate in 1250 cm$^3$ of the isoparaffin fraction were used. From the product obtained was taken a portion corresponding to 25 g of the original silica. This portion was placed in a 500 cm$^3$ jacketted glass reaction vessel provided with a stirrer. To the reaction vessel was added, at ambient temperature, 250 cm$^3$ of undiluted bis(n-butoxy) titanium dichloride. The mixture was stirred, heated to 80° C. and maintained at that temperature for two hours. The supernatant liquid was decanted off, the solid was washed three times using 300 cm$^3$ of the isoparaffin fraction at 80° C. and six further times using 300 cm$^3$ of the isoparaffin fraction at ambient temperature. The solid was finally resuspended in 300 cm$^3$ of the isoparaffin fraction. The solid reaction product obtained will hereafter be identified as TMC VIII.

EXAMPLE 9

Preparation of transition metal reaction product

The remaining portion of the product of steps (a), (b) and (c) of Example 8 was suspended in 1050 cm$^3$ of titanium tetrachloride at ambient temperature, and the mixture was then heated to 80° C., the procedure otherwise being as described in step (d) of Example 5 with the exception that the washes each used 1500 cm$^3$ of the isoparaffin fraction and all of the solid was dried.

In a 500 cm$^3$ glass reaction vessel fitted with a stirrer was placed a portion of the dried solid which contained 11.74 mM of titanium on 25 g of silica. 250 cm$^3$ of the isoparaffin fraction were added at ambient temperature, the mixture was stirred and 4 cm³ (11.74 mM) of tetrakis (n-butoxy) titanium was added at ambient temperature. The mixture was stirred at ambient temperature for one hour, the supernatant liquid was decanted off, the solid was washed five times using 200 cm³ of the isoparaffin fraction at ambient temperature for each wash and finally resuspended in 200 cm³ of the isoparaffin fraction.

The solid reaction product obtained will hereafter be identified as TMC-IX.

EXAMPLE 10

Preparation of transition metal reaction product

Step (a) of Example 1 was repeated using 117.6 g of alumina, 1200 cm³ of the isoparaffin fraction and 13 cm³ of silicon tetrachloride.

Step (b) of Example 1 was repeated using 100 cm³ of a 0.59 M solution of magnesium dibutyl.

Step (c) of Example 1 was repeated by adding to the reaction mixture from step (b), 11.7 cm³ of bis(n-butoxy) titanium dichloride, the procedure being otherwise as described in step (c) of Example 1. The solid reaction product present in the reaction mixture will hereafter be identified as TMC-X.

formula $C_6F_{13}O(CH_2CH_2O)$ where n has a value of from 16 to 18.

The contents of the reactor were stirred and heated up to 80° C. The reactor was vented to 2.53 kg/cm² gauge pressure. Ethylene was added to give a total pressure of 80 psi gauge (5.6 kg/cm² gauge). One of the transition metal components TMC-I, or TMC IV to TMC X was then added in a quantity to attain, and subsequently to maintain, a monitored ethylene consumption of between 1.0 and 1.5 kg per hour. Ethylene was added at a rate sufficient to maintain the pressure of 80 psi gauge (5.6 kg/cm² gauge). During the reaction, unless otherwise indicated, a 0.1 M solution of aluminium trioctyl in hexane was added continuously at a rate of 40 millimoles per hour.

Polymerisation was terminated and the polymer product was then recovered by transferring to a vessel of 200 liters capacity containing 50 liters of a 0.01 N aqueous solution of sodium hydroxide and then passing steam through the stirred mixture until all of the hexane had been evaporated. The aqueous polymer suspension was then filtered and the polymer was dried in a fluid bed drier using hot nitrogen was the fluidising gas.

The results obtained are set out in Table I

TABLE I

| Ex No (a) | TMC Ref (b) | TMC Amount (mM) (c) | Polymer MFI (d) | Polymer Density (kg/m³) (e) | Polymer Yield (kg) | Polyn Time (hrs) (f) | S. Ex. (h) | Activity (j) |
|---|---|---|---|---|---|---|---|---|
| 11* | I | 4.8 | 1.2 | 925 | 1.27 | 1.00 | 1.51 | ND |
| 12 | IV | ND | 31.1 | 923.4 | ND | ND | ND | 31 |
| 13 | V | ND | 6.1 | 922.3 | ND | ND | 1.31 | 49 |
| 14 | IV | ND | 6.6 | 918.7 | ND | ND | 1.30 | 140 |
| 15 | VII | ND | 15.8 | ND | ND | ND | 1.45 | 12 |
| 16 | VIII | ND | 6.4 | ND | ND | ND | 1.25 | 216 |
| 17 | IX | ND | 3.9 | ND | ND | ND | 1.28 | 57 |
| 18 | X | ND | 0.75 | ND | ND | ND | 1.44 | 30 |

Notes to Table I
ND means quantity not determined.
(a) In the Example marked *, 200 millimoles of aluminum trioctyl were present in the initial reaction mixture and no further aluminum trioctyl was added during the course of the polymerisation.
(b) As defined in Preparations I to X.
(c) Is given as total mM of titanium contained in the product of Preparations I to X which was added to initiate and maintain the polymerisation.
(d) MFI is melt flow index measured by ASTM Method D 1238-70 at 190° C. using a 2.16 kg weight.
(e) Density was measured as described in ASTM 1928/70, Method A, using a density gradient column at 23° C.
(f) Figures after the decimal point equal minutes, that is 1.10 means 1 hr 10 minutes.
(h) S. Ex. is stress exponent and is given by the relationship $$\frac{Log_{10} \text{ MFI } 5 - Log_{10} \text{ MFI } 2.16}{Log_{10} 5 - Log_{10} 2.16}$$

where MFI 5 is the melt flow index measured as in (d) using a 5 kg weight and MFI 2.16 is the melt flow index measured as in (d).
(j) Activity is the monitored weight of ethylene monomer added during the polymerisation for each millimole of transition metal at one kg/cm² ethylene pressure in a time of one hour.

In the foregoing procedure, in step (a) one millimole of silicon tetrachloride was used for each gramme of alumina, in step (b) 0.5 millimole of magnesium dibutyl was used for each gramme of alumina and in step (c), about 0.5 millimole of bis(n-butoxy) titanium dichloride was used for each gramme of alumina (subsequent analysis showed that the final product contained 0.38 mM of titanium for each gramme of alumina).

EXAMPLES 11 TO 18

Into a stirred stainless steel autoclave of 30 liters capacity were introduced, under hydrogen at a pressure of 4.2 kg/cm² gauge, 13 liters of a mixture of hexane and butene-1 containing 7% by weight of butene-1. The mixture also contained 40 millimoles of aluminium trioctyl and 50 ppm by weight of an antistatic agent of the

EXAMPLES 19 AND 20

400 cm³ of the isoparaffin fraction were added under nitrogen to a one-liter jacketted glass vessel provided with a stirrer. The vessel and its contents were heated to 60° C. One cm³ of a 2% by volume solution, in the isoparaffin fraction, of the antistatic agent used in Example 4 was then added. The vessel was evacuated and ethylene added to atmospheric pressure. The evacuation and addition of ethylene was repeated three more times to leave an atmosphere of ethylene in the vessel. 10 millimoles of aluminium tri-isobutyl were then added followed by a sufficient quantity of either TMC-II or TMC-III to provide 0.5 millimoles of total transition metal. Ethylene was added to maintain the pressure at one atmosphere and polymerisation was continued until a steady rate, or a maximum rate, of polymerisation had been attained. Both catalyst systems were found to be effective to polymerise ethylene.

EXAMPLE 21

A 20 cm internal diameter fluidised bed reactor vessel, operated in a continuous manner, was used to produce an ethylene/butene-1 copolymer. A reaction mixture comprising ethylene, butene-1 and hydrogen was circulated continuously through the bed at a superficial velocity estimated to be about four times the minimum necessary for fluidisation. In the fluidised bed, the reaction temperature was controlled at 80° C. by adjusting the temperature of the gas fed to the fluidised bed reactor vessel using a heat exchanger in the circulating gas loop. Aluminum trioctyl was pumped continuously into the reactor as a 0.25 molar solution in n-hexane. The solid reaction product TMC V was blown into the reactor as a dry powder in a stream of process gas at frequent intervals so as to maintain a rate of polymer production of about 1.5 kg/hr, which corresponds to a mean residence time of four hours. The reaction pressure was maintained automatically by admitting an ethylene/hydrogen mixture through a control valve. Liquid butene-1 was pumped into the circulating gas stream so as to maintain a constant composition as determined by Gas Liquid Chromotography.

The polymer formed was removed periodically so as to maintain an essentially constant level in the reactor vessel. The polymer collected was degassed in a stream of nitrogen which had been passed over a bath of water at ambient temperature, and then through a steam jacket. The use of this warm, moist nitrogen removed monomers and also de-activated the catalyst and alkyl residues.

Further details, together with some characteristics of the polymers obtained, are set out in Table II.

or of the formula $$R_c^2MgZ_{(2-c)} + dR_e^2AlZ_{(3-e)}$$

a component III which is at least one halogen-containing component selected from hydrogen halides, boron halides, halogens, inter-halogen compounds and halides of elements of Groups IVB, VA and VIB of the Periodic Table, and a component IV which is a transition metal compound of the formula $$MO_aR_bX_n;\text{ and}$$

(2) an organic compound of a metal of Group IIA of the Periodic Table or of aluminium or a complex of an organic compound of a metal of Group IA or Group IIA of the Periodic Table with an organic compound of aluminium;

where:
M is transition metal of Group IVA, VA or VIA of the Periodic Table;
X is a halogen atom other than fluorine;
R is a hydrocarbon radical, a substituted hydrocarbon radical or a group $OR^1$;
$R^1$ is a hydrocarbon radical or a substituted hydrocarbon radical;
each $R^2$, which may be the same or different, is a hydrocarbon radical;
each Z, which may be the same or different, is a group $OR^1$ or a halogen atom other than fluorine;
n is 0 or a number up to the valency of M with the exception that when M is titanium n does not have a value of 4;
a is 0 or 1;
b is 0 or a number up to the valency of M;

TABLE II

| Ex No | TMC V Rate (mM/hr) (b)(c) | Alkyl Rate mM/hr | Gas Composition Mole % (k) Eth | B-1 | Hy | Rate of Polymer Production kg/hr (l) | Polymer MFI (d) | Polymer Density kg/m³ (e) | Reaction Pressure (kg/cm² absolute) | S.Ex. (h) |
|---|---|---|---|---|---|---|---|---|---|---|
| 21 | 2.35 | 12.5 | 58.3 | 23.4 | 18.3 | 1.45 | 1.5 | 924.8 | 23.5 | 1.26 |

Notes to Table II
(b), (c), (d), (e) and (h) are all as defined in Notes to Table I.
(k) Eth is ethylene
B-1 is butene-1
Hy is Hydrogen.
(l) This is the rate at which polymer is removed from the reactor vessel in order to maintain an essentially constant level in the reactor vessel.

We claim:
1. An olefine polymerisation process wherein at least one olefine monomer is contacted, under polymerisation conditions, with an olefine polymerisation catalyst which comprises
    (1) a reaction product obtained by reacting together a component I which is at least one substantially inert solid metal oxide having reactive sites, with a component II which is an organic magnesium compound of the formula

$$R_c^2MgZ_{(2-c)}$$

or a complex or mixture of an organic magnesium compound and an aluminium compound of the formula $$R_c^2MgZ_{(2-c)}dR_e^2AlZ_{(3-e)}$$

$2a+b+n$ equals the valency of M;
c has a value of greater than 0 up to 2;
d has a value of greater than 0 up to 2; and
e has a value of from 0 up to 3.
2. The process of claim 1 wherein the olefine polymerization catalyst also includes a Lewis Base compound.
3. The process of claim 1 wherein ethylene, or a mixture of ethylene and another olefine monomer, is polymerised in the gas phase.
4. The process of claim 1 wherein, in the production of the reaction product which is component (1) of the olefine polymerisation catalyst, there has also been used a component V, which is a Lewis Base compound.
5. The process of claim 1 wherein, in the production of the reaction product which is component (1) of the olefine polymerisation catalyst, there has also been used titanium tetrachloride in an amount such that not more than 75% molar of the total molar proportion of transition metal compounds present in the reaction product are derived from the titanium tetrachloride.

6. The process of claim 1 wherein, in the production of the reaction product is which component (1) of the olefine polymerisation catalyst, there have been used, as component I, an oxide of a metal, including silicon, of Groups I to IV of the Periodic Table; as component II, a dihydrocarbyl magnesium compound; as component III, a hydrogen halide, a silicon halide of the formula $R_f^3SiX_{(4-f)}$, a hydrocarbyl halide of the formula $R^5X_g$ a phosphorus halide, a phosphorus oxyhalide, a boron halide, chlorine or bromine; and as component IV, vanadium oxytrichloride, tetrakis(ethoxy)titanium, tetrakis (n-butoxy)titanium, bis(isopropoxy)titanium dichloride, bix(n-butoxy)titanium dichloride, zirconium tetrabenzyl or zirconium tetraneophyl, wherein
   $R^3$ is a hydrogen atom or a hydrocarbon radical;
   $R^5$ is the residue obtained by removing one or more hydrogen atoms from a hydrocarbon compound;
   X is a halogen atom other than fluorine;
   f is 0 or an integer from 1 up to 3; and
   g is an integer from 1 up to 10.

7. The process of claim 1 wherein, in the production of the reaction product which is component (1) of the olefine polymerisation catalyst, the reaction product has been obtained either (a) by mixing all of the components together in a single stage, or (b) adding the components II, III and IV in sequence to component I subject to the proviso either (i) that at least one further component is added after the addition of component III, or (ii) a reaction with either the transition metal compound which is component IV, and/or a reaction with titanium tetrachloride, is effected as the last stage.

8. The process of claim 7 wherein the reaction product has been obtained by adding components II, III and IV in sequence to component I to give more than one stage and the stages have been effected in succession without separating the reaction product from the reaction mixture of one stage before adding a further component to effect the next stage.

9. The process of claim 7 wherein the reaction product has been obtained by adding the components in sequence to component I and an excess quantity of at least one of components II, III or IV, or of a Lewis Base compound or of titanium tetrachloride has been used, and the reaction product from any stage in which such an excess has been used has been separated and washed before the reaction product has been subjected to a subsequent stage of the process.

10. The process of claim 7 wherein the reaction product has been obtained by adding the components in sequence and at least one further component which is component II, component IV, a Lewis Base compound or titanium tetrachloride, has been added after the addition of component III.